(12) United States Patent
Greenwald (10) Patent No.: US 7,712,401 B1
(45) Date of Patent: May 11, 2010

(54) CUTTING HEAD ASSEMBLY FOR ON-VEHICLE BRAKE LATHE

(75) Inventor: Christopher L. Greenwald, Concord, NH (US)

(73) Assignee: Pro-Cut Licensing Company, LLC, West Lebanon, NH (US)

( * ) Notice: Subject to any disclaimer, the term of this patent is extended or adjusted under 35 U.S.C. 154(b) by 808 days.

(21) Appl. No.: 11/420,240

(22) Filed: May 25, 2006

(51) Int. Cl.
*B23B 3/22* (2006.01)
(52) U.S. Cl. .............................. 82/112; 82/1.11; 82/47; 82/158
(58) Field of Classification Search ................. 82/1.11, 82/112; 408/153, 154, 155, 159, 161, 168, 408/180; 269/73, 219, 231, 234, 238; 144/209, 144/210, 211, 212, 213, 214, 215.2, 215.3, 144/215.4
See application file for complete search history.

(56) References Cited

U.S. PATENT DOCUMENTS

| | | | | |
|---|---|---|---|---|
| 747,833 | A * | 12/1903 | Alger et al. ................... 470/58 |
| 1,260,271 | A | 3/1918 | Kramer |
| 1,485,731 | A * | 3/1924 | Stangbye .................... 269/103 |
| 1,992,403 | A | 2/1935 | Stuhlmacher |
| 2,174,860 | A | 10/1939 | Montgomery et al. |
| 2,441,533 | A | 5/1948 | Montgomery |
| 2,720,141 | A | 10/1955 | Seyferth |
| 2,844,379 | A * | 7/1958 | Schulz ........................ 279/120 |
| 3,133,385 | A | 5/1964 | Banka |
| 3,464,710 | A * | 9/1969 | Schultz et al. ............. 279/4.08 |
| 3,529,859 | A | 9/1970 | Garczynski |
| 4,049,282 | A * | 9/1977 | Yearsley ....................... 279/50 |
| 4,510,828 | A * | 4/1985 | Bogaerts et al. ............... 82/112 |
| 4,911,574 | A * | 3/1990 | VanderPol et al. .......... 403/373 |
| 5,551,795 | A * | 9/1996 | Engibarov .................. 403/381 |
| 5,623,859 | A * | 4/1997 | Benton ........................ 82/136 |
| 5,765,457 | A * | 6/1998 | Meyer et al. .................. 82/112 |
| 6,216,571 | B1 * | 4/2001 | Newell et al. ................ 82/1.11 |
| 6,363,821 | B1 | 4/2002 | Greenwald et al. |
| 6,435,496 | B1 * | 8/2002 | Phillips ........................ 269/94 |

(Continued)

FOREIGN PATENT DOCUMENTS

JP 56163854 A * 12/1981

OTHER PUBLICATIONS

Pro-Cut International, 10 Technology Drive, # 4, West Lebanon, NH 03784 PFM 9.0 Technical Manual (undated), pp. 8 and 9 downloaded from URL: http://www.procutinternational.com/pdf/pfm90_manual.pdf.

*Primary Examiner*—Jason Daniel Prone
*Assistant Examiner*—Jennifer Swinney
(74) *Attorney, Agent, or Firm*—Michael J. Weins; Jeffrey E. Semprebon (57) ABSTRACT

A cutting head assembly holds a pair of tool bits for an on-vehicle brake disk lathe having a platform. The cutting head assembly has a platform key fixed to the platform and extending parallel to a brake disk axis of rotation. The cutting head assembly also has a plate having a plate keyway that slidably engages the platform key. Tool bit arms are adjustably mounted to the plate and support the tool bits. A locking structure connected to the plate locks the platform key with respect to the plate keyway, and the interaction of the locking structure with the plate and the platform key creates a compressive load between the plate and the platform as the platform key is locked with respect to the plate keyway.

7 Claims, 8 Drawing Sheets

U.S. PATENT DOCUMENTS

| | | | |
|---|---|---|---|
| 6,698,739 B1 * | 3/2004 | McKim | 269/234 |
| 7,143,916 B2 * | 12/2006 | Oetlinger | 225/104 |
| 7,163,364 B2 * | 1/2007 | Foscan et al. | 409/81 |
| 2006/0207395 A1 * | 9/2006 | Place et al. | 82/113 |

* cited by examiner

CUTTING HEAD ASSEMBLY FOR ON-VEHICLE BRAKE LATHE

FIELD OF THE INVENTION

The present invention relates to on-vehicle brake disk lathes, and more particularly to a cutting head assembly for such a lathe that provides improved stability and ease of adjustment.

BACKGROUND OF THE INVENTION

On-vehicle brake disk lathes are employed to machine the surfaces of brake disks to maintain the brakes in proper working order. The on-vehicle lathe mounts to a wheel hub of the vehicle and allows the disk associated with that hub to be machined without requiring the disk to be removed from the vehicle on which it is mounted. Such lathes have a movable cutting head assembly which serves to position a pair of tool bits that machine the surfaces of the brake disk while the brake disk is rotated about a disk axis. The tool bits are each supported on an arm, and the arms in turn are adjustably mounted to a plate. Arm adjusting knobs mounted to the plate are functionally connected to the pair of arms to cause the arms to move in response to rotation of the knobs. The movement of the arms moves the tool bits in a direction that is substantially parallel to the disk axis, and the position of the tool bits determines the depth of the cuts on the disk surfaces when they are machined.

Since the on-vehicle lathe mounts to a wheel hub and the distance from the wheel hub to the brake disk differs for different vehicles, the plate on which the arms are mounted should be adjustable in a direction parallel to the disk axis to allow the tool bits to be positioned straddling the brake disk. The plate must also be movable in a direction normal to the disk axis, to allow the tool bits to be drawn across the disk surfaces during the machining procedure. These motions are achieved by employing a platform which is mounted on the lathe so as to be advanceable in a direction normal to the disk axis. In turn, the plate is adjustably mounted to the platform such that its position along the platform in a direction substantially parallel to the disk axis can be adjusted as desired.

One approach for adjusting the position of the plate on the platform is taught in U.S. Pat. No. 6,363,821, which teaches a plate with a keyway that is slidably engaged with a key protruding from the platform. The key and the keyway extend substantially parallel to the disk axis. A threaded shaft is rotatably mounted in the platform and threadably engages the plate such that rotation of the shaft causes the plate to slide along the key. The '821 patent teaches the use of a servo to rotate the threaded shaft. To allow sufficient rigidity in maintaining the position of the plate along the platform, the threading of the shaft would need to be relatively fine, as a coarse thread would allow any rotational freedom of the shaft to allow a substantial change in the axial position of the plate. The requirement that fine threads be employed means that repositioning the plate a substantial distance along the platform will require a large number of rotations of the shaft, slowing the adjustment. This approach also suffers in being mechanically complex, and does not appear to have been used commercially.

Figure 1:
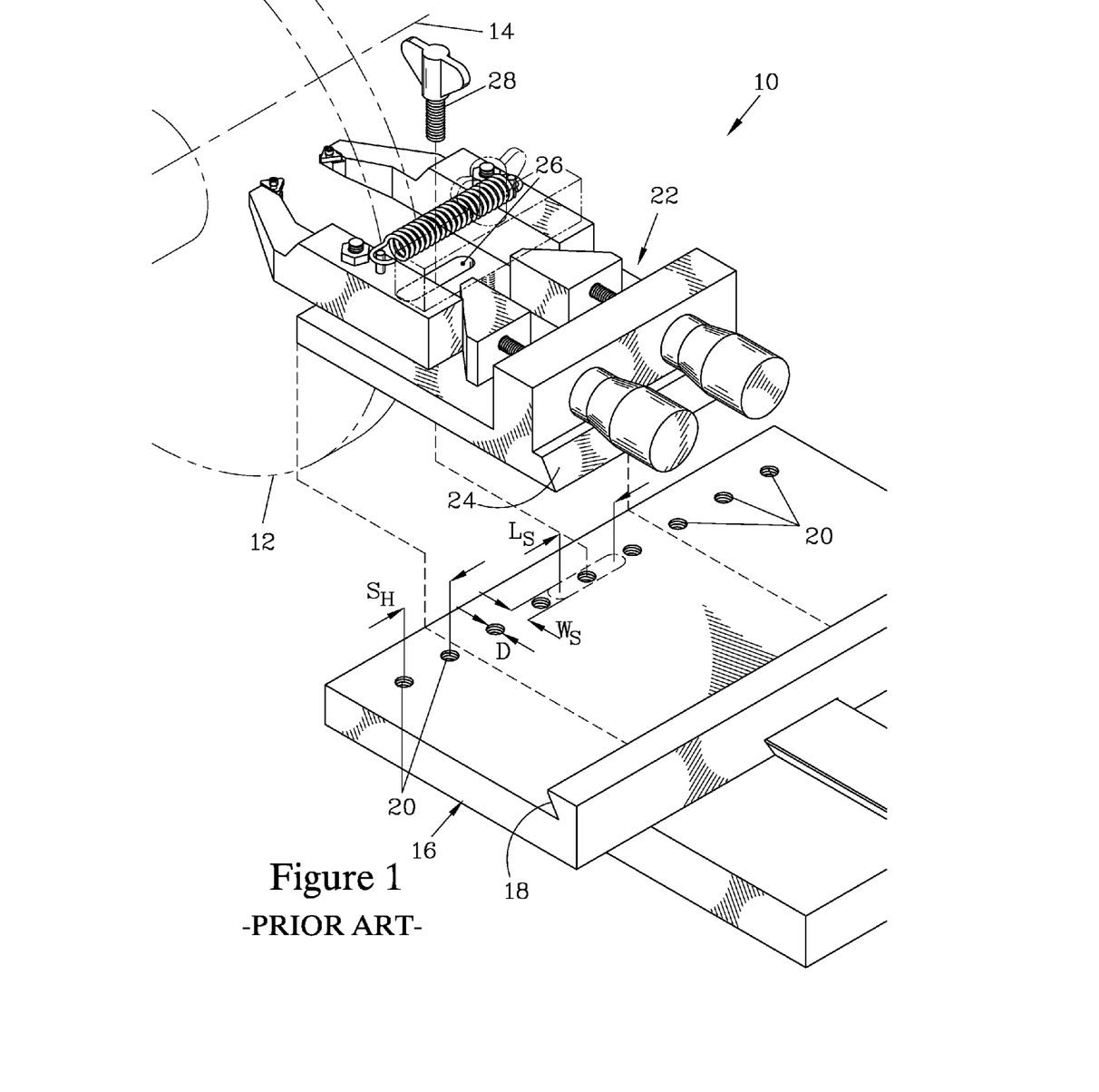
FIG. 1 is an exploded isometric view of a prior art cutting head assembly for an on-vehicle brake disk lathe.
Figure 2:
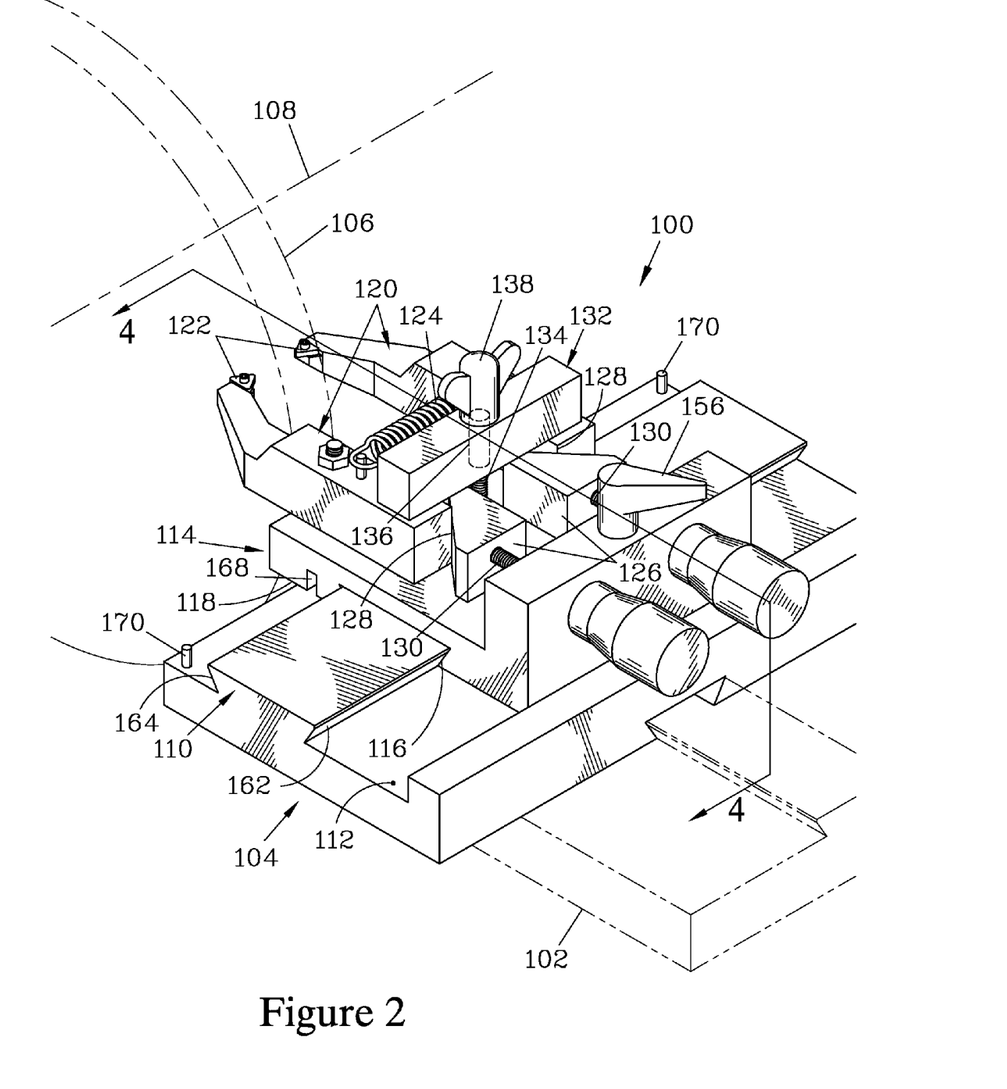
FIG. 2 is an isometric view of one embodiment of the cutting head assembly of the present invention. The cutting head assembly has a plate with a keyway that slidably engages a key protruding from a platform, allowing the plate to be translated along the platform in a direction parallel to a disk axis about which a brake disk rotates.
Figure 3:
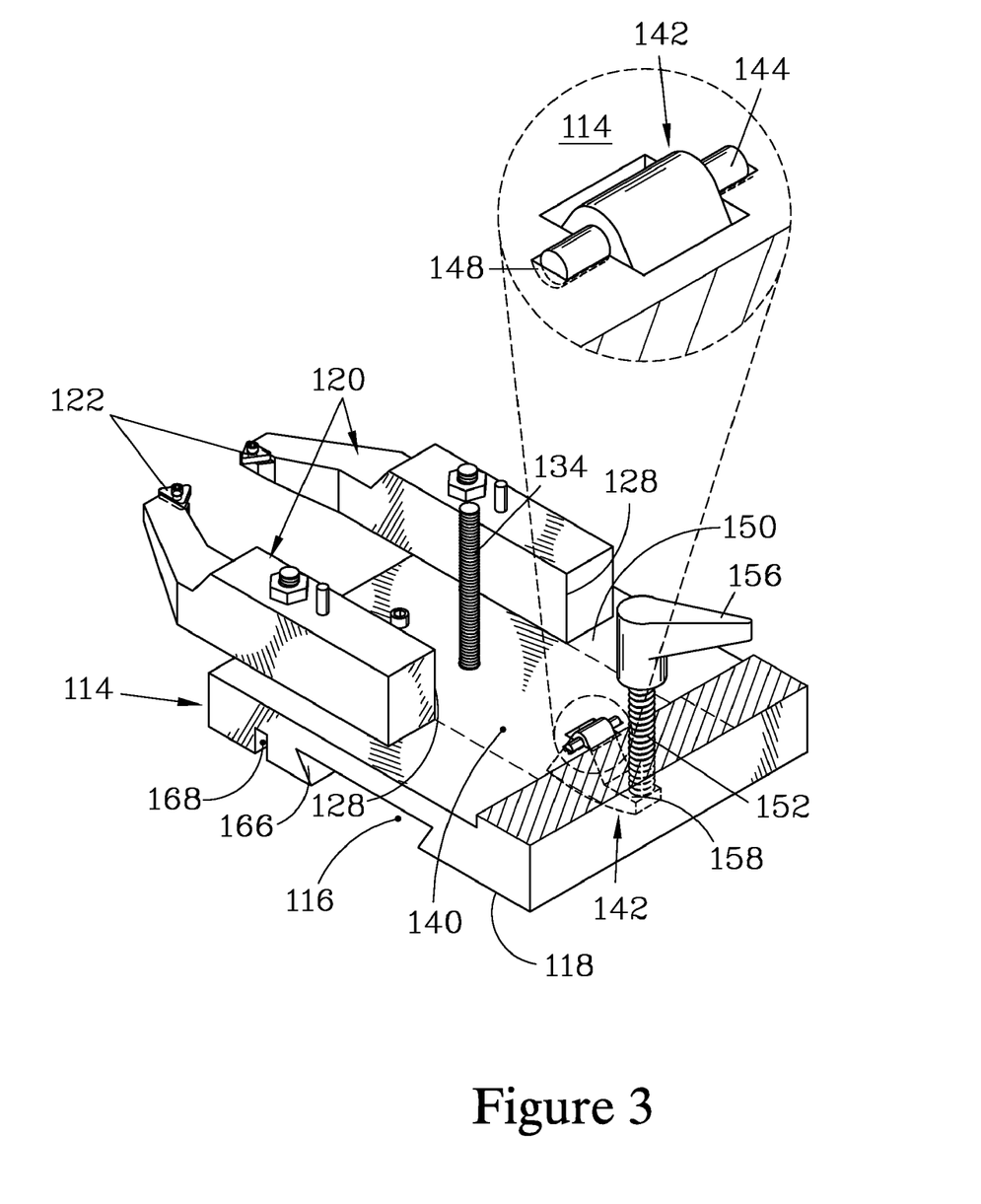
FIG. 3 is an isometric view of the embodiment of FIG. 2 illustrating a region bounded by the tool bit arms, and showing a cam, which is pivotably mounted to the plate, and a cam-activating shaft, which can be advanced to forcibly engage the cam with the key on the platform. The cam and the cam-activating shaft are located in the bounded region.

A simpler approach to adjusting the axial position of the plate on the platform, which has been commercially successful, is illustrated in FIG. 1. FIG. 1 illustrates a cutting head assembly 10 for machining a brake disk 12 that rotates about a disk axis 14. The cutting head assembly 10 employs a platform 16 that is provided with an overhanging inclined rear surface 18 that extends substantially parallel to the disk axis 14. The platform 16 also has a series of threaded holes 20 that are arranged in a line parallel to the overhanging inclined rear surface 18. A plate 22 has an inclined trailing edge 24, which is configured to engage against the overhanging inclined rear surface 18, and has a slot 26 which is oriented with its direction of elongation parallel to the inclined trailing edge 24. A securing bolt 28 passes through the slot 26 and secures into a desired one of the threaded holes 20. Tightening the securing bolt 28 acts to clamp the plate 22 to the platform 16.

The slot 26 has a slot length $L_S$ that is somewhat greater than the separation $S_H$ between adjacent threaded holes 20 to allow continuous adjustment of the position of the plate 22 along the platform 16. The slot is also oversized in width, having a slot width $W_S$ which is greater than the diameter D of the securing bolt 28 that passes therethough, so as to allow the user to slide the inclined trailing edge 24 of the plate 22 into intimate contact with overhanging inclined rear surface 18 before tightening the securing bolt 28. If the desired position of the plate 22 is beyond the range allowed by the slot 26, the user removes the securing bolt 28 from the threaded hole 20 in which it currently resides and places the plate 22 in the desired position, aligning the inclined trailing edge 24 against the overhanging inclined rear surface 18. The securing bolt 28 is then passed through the slot 26 into whichever of the threaded holes 20 resides thereunder, and is tightened to secure the plate 22 in the new position on the platform 16.

While this system benefits in being mechanically simple, it is dependent on correct technique by the operator. To assure adequate stability during the cutting process, the operator must assure that the inclined trailing edge of the plate is firmly pressed against the overhanging inclined rear surface of the platform when tightening the stop bolt. If these surfaces are not tightly engaged, the plate will only be stabilized at the location where it is clamped to the platform by the stop bolt, which may not allow sufficient stability to assure accuracy in machining the brake disk surfaces. Furthermore, since the plate is loose from the platform once the stop bolt is removed, there is a risk of dropping the plate, particularly when the lathe is adjusted when in an inverted position. The need to manipulate separate pieces to adjust the position of the plate complicates the adjustment procedure, and may slow the machining process.

SUMMARY OF THE INVENTION

The present invention is for a cutting head assembly for holding a pair of tool bits of an on-vehicle disk brake lathe. The cutting head assembly attaches to a platform of the on-vehicle disk brake lathe, which in turn slidably engages a base. The base of the on-vehicle disk brake lathe in turn attaches to a vehicle axle. The cutting head assembly stabilizes the tool bits as they are used to machine side surfaces of a disk brake as it rotates about its disk axis. The base and the platform are designed such that, when the cutting head assembly is attached to the platform, motion between the base and the platform will be restricted such that the cutting head assembly will move along a path which is substantially normal to the disk axis of the disk brake when the brake lathe is attached to and aligned with the axle. Means for moving the platform relative to the base are provided, and when the cutting head assembly is attached to the platform, the motion will result in the cutting head assembly moving along the path so as to move the tool bits across the side surfaces of the disk during the machining process. One example of such mounting system for a cutting head assembly and means for moving the platform relative to the base so as to drive the cutting head are shown in U.S. Pat. No. 6,363,821, where the cutting head assembly attaches to a platform that slidably engages the base via a dovetail extending normal to the disk axis, and the platform is driven along the path by a screw.

The cutting head assembly has a platform key which is affixed to the platform, and is preferably formed as an integral part thereof. The platform key extends parallel to the disk axis when the brake lathe is attached to and aligned with the axle. A plate is provided, having a plate keyway that is configured to slidably engage the platform key. Preferably, the platform key and plate keyway are further configured so as to maintain the key and the keyway engaged in the event that the platform is inverted.

It is preferred for the sides of the platform key to be further configured so that the separation between the sides of the platform key generally increase as a linear function of the depth in the keyway. In addition to assuring that inversion of the platform will not cause the plate to disengage from the platform, such configuration facilitates providing means for applying a downward force on a rear section of the plate to force it down against the platform to further stabilize the plate on the platform, as discussed below.

A pair of tool bit arms are provided for positioning and supporting the tool bits. The tool bit arms are each adjustably mounted with respect to the plate and positionable such that the separation between the tool bits can be adjusted. Means for adjusting the separation between the tool bits are provided.

In one preferred embodiment, the adjustment is provided by a pair of tool bit arms that are pivotally mounted to the plate and are positionable such that each of the tool bit arms can be positioned substantially perpendicular to the plate keyway. In such case, the means for adjusting the position between the tool bits is provided by means for adjusting the pitch of the tool bit arms with respect to the plate keyway. Preferably, these means provide for individual adjustment of each of the tool bit arms.

Means for locking the tool bit arms in position with regard to the plate are also provided to lock the arms in the desired position after adjustment.

Means for locking the key with respect to the keyway are provided. The means for locking the key are connected to the plate and are located in a region bounded by the projection of the tool bit arms onto the plate.

Means for applying a force to the region bounded by the projection of the tool bit arms and generating a compressive load between the plate and the platform responsive to the activation of the means for locking the key with respect to the keyway are provided. In some embodiments, a single element can be employed to provide both the means for locking the key with respect to the keyway and the means for applying a force to generate a compressive load between the plate and the platform, thus providing a unified structure for providing these means. In other embodiments, which lack a unified structure, multiple elements are employed to provide these means.

To further aid in retaining the plate on the platform as the platform is inverted, it is preferred to provide a stop element on the plate and limiting elements on the platform that are positioned to bracket the stop element and to engage the stop element to limit translation of the plate along the platform. In a preferred embodiment, the limiting elements are provided by a pair of limit pins which extend from the platform and are positioned to align with a pin slot in the plate. The motion of the limit pins in the pin slot is limited by a pin slot screw which extends into the pin slot and resides between the pins. The pin slot screw extends into the pin slot sufficiently far as to engage either of the pins to limit the sliding motion of the plate, thereby providing the stop element. The pin slot screw can preferably be removed to allow the plate to be slidably removed from the platform.

BRIEF DESCRIPTION OF THE FIGURES

FIG. 6 is an isometric view of the embodiment shown in FIGS. 2 through 5 with the plate sectioned to better illustrate the cam and the cam-activating shaft. FIG. 6 also better shows the mechanism for adjusting the pitch of one of the tool bit arms. This figure also shows a pin slot, a pair of limit pins, and a pin slot screw that maintain the plate on the platform and prevent the plate from sliding off the platform.

FIG. 7 is an isometric view of an embodiment that employs a sliding locking block as the locking element. The locking block has a T-shaped cross section, with a block body that resides in a cavity and is configured to engage one side of the key, and a pair of block extensions that slidably engage a recessed region in the plate. A block-activating shaft is threadably mounted in the plate, extending normal to the keyway. When the block-activating shaft is threadably advanced, it engages the locking block and forces the block body against the key. Since the side of the key is inclined, the forcible engagement creates a downward force on the locking block as it slides against the side of the key. This downward force on the locking block is transferred to the plate by the engagement of the block extensions with ledges formed in the recessed region, thereby forcing the plate against the platform.

DETAILED DESCRIPTION OF THE PREFERRED EMBODIMENTS

FIGS. 2 through 6 illustrate a cutting head assembly 100 which forms one embodiment of the present invention. The cutting head assembly 100 is mounted to an on-vehicle disk brake lathe having a base 102 (shown in phantom) and a platform 104. The cutting head assembly 100 is designed to machine surfaces of a brake disk 106 while the brake disk 106 it is rotated about a disk axis 108, defined as the axis of rotation of the brake disk 106. The lathe is mounted to a wheel hub (not shown) associated with the brake disk 106 and aligns itself with the disk axis 108. Thereafter, the platform 104 is driven along a path that is normal to the disk axis 108 during the machining operation to move the cutting head assembly 100 across the brake disk 106. On-vehicle disk brake lathes that mount to a wheel hub and have the ability to align themselves with the axis of rotation of the wheel hub are taught in U.S. Pat. Nos. 5,974,878; 6,050,160; 6,216,571; and continuations thereof. In the following description, it is assumed that the brake lathe has been mounted to and aligned with the wheel hub. In the embodiment illustrated, movement of the platform 104 is achieved by designing the platform 104 to slidably engage the base 102 in a direction normal to the disk axis 108. Means for driving the platform 104 are provided, and driving means such as screw mechanisms and rack-and-pinion mechanisms are well known in the art, and thus not illustrated.

The cutting head assembly 100 of the present invention has a platform key 110 which is affixed to the platform 104. The platform key 110 is preferably formed as an integral part of the platform 104, but could be formed as a separate part and affixed to the platform by screws, welding, or similar techniques. In all cases, the platform key 110 protrudes from a platform planar surface 112 and extends parallel to the disk axis 108.

A plate 114 is provided, having a plate keyway 116 that is configured to slidably engage the platform key 110 and a plate planar surface 118 that faces the platform planar surface 112 when the plate keyway 116 is engaged with the platform key 110. A pair of tool bit arms 120 are pivotably mounted to the plate 114, each of the arms 120 supporting a tool bit 122. The arms 120 are positionable so as to adjust the separation between the tool bits 122. In this embodiment, each of the tool bit arms 120 can be held in a position where it extends substantially perpendicular to the plate keyway 116, and can be pivoted to adjust the position of the tool bit 122 mounted thereon.

Means for individually adjusting the pitch of each of the arms 120 with respect to the plate keyway 116 are provided, which provide means for adjusting the separation between the tool bits 122. In the embodiment illustrated, a tension spring 124 is connected between the arms 120 and acts to draw the arms 120 together; since the arms 120 pivot about points located between the tension spring 124 and the tool bits 122, the tension spring 124 biases the tool bits 122 apart. A pair of wedges 126 reside on the plate 114, and each of the wedges 126 engages an arm rear surface 128 of one of the arms 120 to limit the position of the arm 120. When one of the wedges 126 is advanced toward the tool bits 122, the wedge 126 forces the arm 120 to pivot against the bias of the tension spring 124, moving the tool bit 122 mounted to that arm 120 toward the other tool bit 122, reducing the separation between the tool bits 122. This motion corresponds to an increase in the depth of cut that will result from machining the brake disk 106 with that tool bit 122. Conversely, when the wedge 126 is retracted away from the tool bits 122, the arm 120 is allowed to pivot under the bias of the tension spring 124, moving the tool bit 122 mounted on that arm 120 away from the other tool bit 122 and increasing the separation between the tool bits 122. A pair of wedge-advancing shafts 130 are mounted to the plate 114. Each of the wedge-advancing shafts 130 is connected to one of the wedges 126 so as to advance or retract the wedge 126 as the wedge-advancing shaft 130 is turned by a lathe operator. In this embodiment, the wedge-advancing shafts 130 are each rotatably mounted in the plate 114 and threadably engaged with one of the wedges 126. It will be appreciated by one skilled in the art that alternative mechanisms for adjusting the pitch of the tool bit arms could be employed.

When the tool bit arms 120 have been positioned to set the desired depth of cut, means for locking the tool bit arms 120 in position are employed to lock the tool bit arms 120 to maintain the depth of cut as the brake disk 106 is machined. In this embodiment, such means are provided by a lock bar 132 that forcibly engages the tool bit arms 120. A threaded post 134 (better shown in FIG. 2) extends from the plate 114 at a location between the tool bit arms 120, and the lock bar 132 has a post passage 136 sized to pass over the threaded post 134. A hand nut 138 is provided, which is configured to threadably engage the threaded post 134. When the hand nut 138 is manually tightened by the operator, the hand nut 138 forcibly engages the lock bar 132 and causes it, in turn, to forcibly engage the tool bit arms 120 so as to clamp the tool bit arms 120 against the plate 114, thereby locking them in the desired position.

The means for individually adjusting the pitch of the tool bit arms 120 provides fine positioning of the tool bits 122. However, due to the different configurations of wheel hubs, there is a need for coarse adjustment of the positions of both tool bits 122 in a direction parallel to the disk axis 108. Such positioning is provided by sliding the plate 114 along the platform key 110. Once the plate 114 is in the desired position, means for locking the platform key 110 with respect to the plate keyway 116 are activated. These means resides principally in the plate 114 and are located in a region 140 (shown in FIG. 3) that is bounded by the projection of the tool bit arms 120 when the tool bit arms 120 are held substantially perpendicular to the plate keyway 116. Locating these means principally in the region 140 results in the clamping forces being substantially centered between the tool bits 122, so that the resulting forces experienced by the tool bits 122 are balanced.

In this embodiment, the means for locking the key are provided by a cam 142, shown in FIGS. 3 through 6. The cam 142 is mounted on a cam shaft 144 and substantially resides in a cavity 146 (shown in FIGS. 4 through 6) in the plate 114. The cavity 146 is formed with a cradle 148 adjacent a plate upper surface 150 of the plate 114, the cradle 148 supporting the cam shaft 144 so as to allow the cam 142 to pivot with respect to the plate 114. The cavity 146 communicates with the plate keyway 116 so that the cam 142 can be pivoted, at least in part, into the plate keyway 116. Thus, when the plate 114 is slidably engaged with the platform 104, pivoting of the cam 142 causes the cam 142 to engage the platform key 110.

The cam 142 also provides means for applying a force to the region 140 that generates a compressive load between the plate 114 and the platform 104 when the means for locking the platform key 110 are activated, thus forming a unified structure for providing both these means. As shown in the section views of FIGS. 4 and 5, the platform key 110 is preferably configured such that its width $W_{PK}$ increases as a linear function of its height above the platform planar surface 112, giving the platform key 110 and the plate keyway 116 trapezoidal cross sections. With such a configuration, forcible pivoting of the cam 142 against the platform key 110 results in a downward force being applied to the cradle 148 by the cam shaft 144, thus creating a compressive load between the plate 114 and the platform 104. The compressive load causes the platform planar surface 112 and the plate planar surface 118 to forcibly engage together, affixing the plate 114 to the platform 104 so as to provide stable support for the tool bit arms 120 as the tool bits 122 are drawn across the brake disk 106 during the machining procedure.

Figure 4:
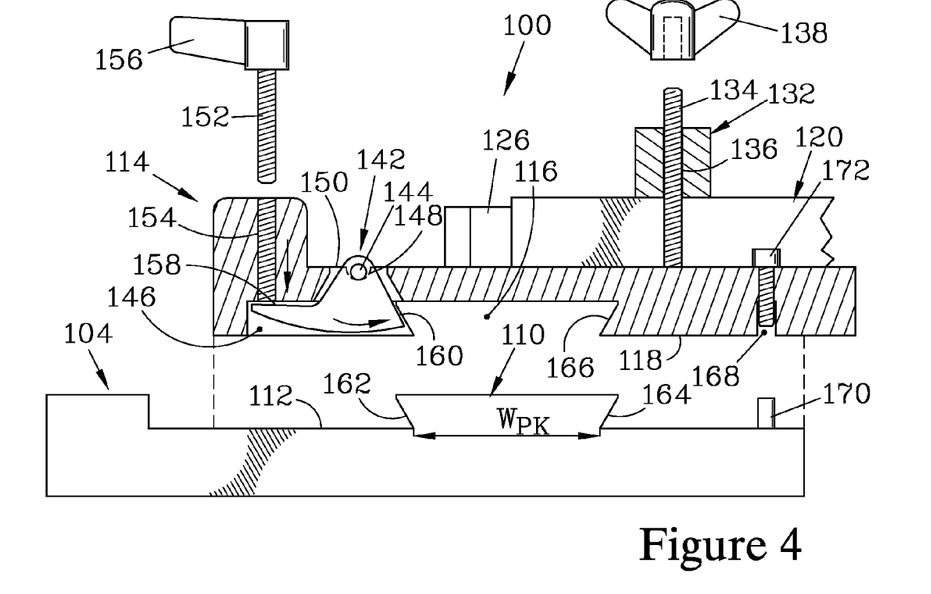
FIG. 4 is a view of the section 4-4 of FIG. 2, showing the cutting head assembly before the cam-activating shaft has been advanced to pivot the cam.
Figure 5:
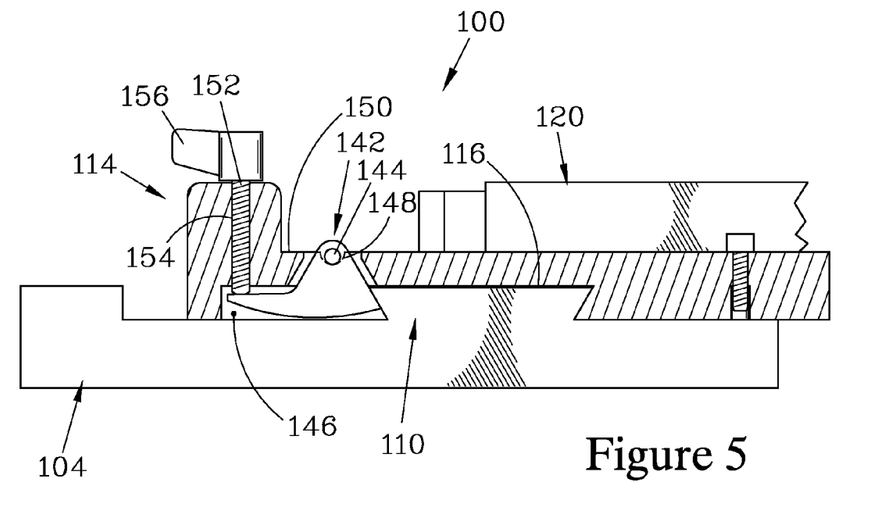
FIG. 5 is a view of the section 4-4 when the cam-activating shaft has been threadably advanced in a shaft passage in the plate, causing the cam to forcibly engage the key, and creating a compressive load between the plate and the platform.

To activate the cam 142, a cam-activating shaft 152 is provided, which resides in a shaft passage 154 in the plate 114. The cam-activating shaft 152 is positioned such that, when advanced in the shaft passage 154, it engages the cam 142 so as to forcibly pivot the cam 142 into engagement with the platform key 110. Means for advancing the cam-activating shaft 152 are provided. In the embodiment illustrated, the cam-activating shaft 152 and the shaft passage 154 are threaded, such that rotation of the cam-activating shaft 152 causes it to threadably advance in the shaft passage 154. A turn-down handle 156 is provided to allow an operator to rotate the cam-activating shaft 152.

Figure 6:
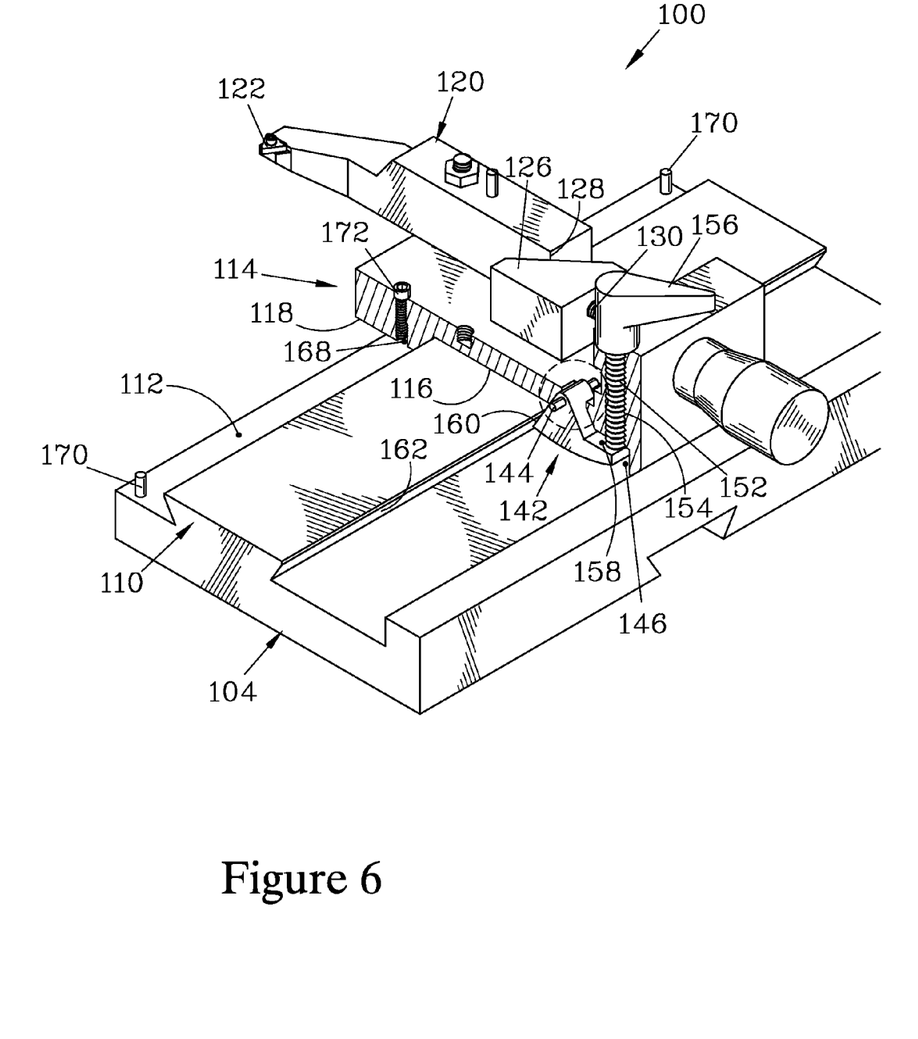

FIG. 5 illustrates the position of the cam 142 after tightening the turn-down handle 156, while FIG. 6 better shows the engagement of the cam 142 with the cam-advancing shaft 152, as well as the engagement of the cam shaft 144 with the cradle 148. As the turn-down handle 156 is tightened, the cam-activating shaft 152 is advanced in the shaft passage 154 in the plate 114. The advancing cam-activating shaft 152 in turn forcibly engages a shaft-engaging surface 158 on the cam 142, causing the cam 142 to rotate either on or with the cam shaft 144 with respect to the cradle 148 in which the cam shaft 144 resides. As the cam 142 rotates, a platform key engaging surface 160 on the cam 142 is brought into forcible contact with a key first side 162 of the platform key 110. The force transmitted results in a force between a key second side 164 (shown in FIG. 4) of the platform key 110 and a keyway mating surface 166 of the plate keyway 116. These forces result in the cam shaft 144 being forced into the cradle 148, placing a downward force on the plate 114 and causing it to bind against the platform planar surface 112.

FIG. 6 also illustrates a preferred means for limiting the translation of the plate 114 along the platform 104. This means serves to prevent the plate 114 from sliding off the platform 104 as the position of the plate 114 is adjusted. In this embodiment, a pin slot 168 is provided in the plate 114, facing the platform planar surface 112 and terminating at the plate planar surface 118. A pair of limit pins 170 are mounted to the platform 104, protruding upward from the platform planar surface 112 and positioned such that the pin slot 168 can pass over either of the limit pins 170 as the plate 114 is slid along the platform 104. To limit the range of motion of the plate 114 with respect to the platform 104, a pin slot screw 172 is mounted to the plate 114 so as to extend into the pin slot 168 and be bracketed by the limit pins 170. The pin slot screw 172 extends into the pin slot 168 a sufficient distance as to engage one of the limit pins 170 when the plate 114 is slid far enough away from a central position on the platform 104. The engagement of the pin slot screw 172 with the limit pin 170 prevents further motion of the plate 114 in that direction, preventing it from being slid off the platform 104. If the operator desires to remove the plate 114 for repair, maintenance, or replacement, the pin slot screw 172 is removed and the plate 114 is then free to slide along the platform 104 until the platform key 110 and the plate keyway 116 become disengaged.

Figure 7:
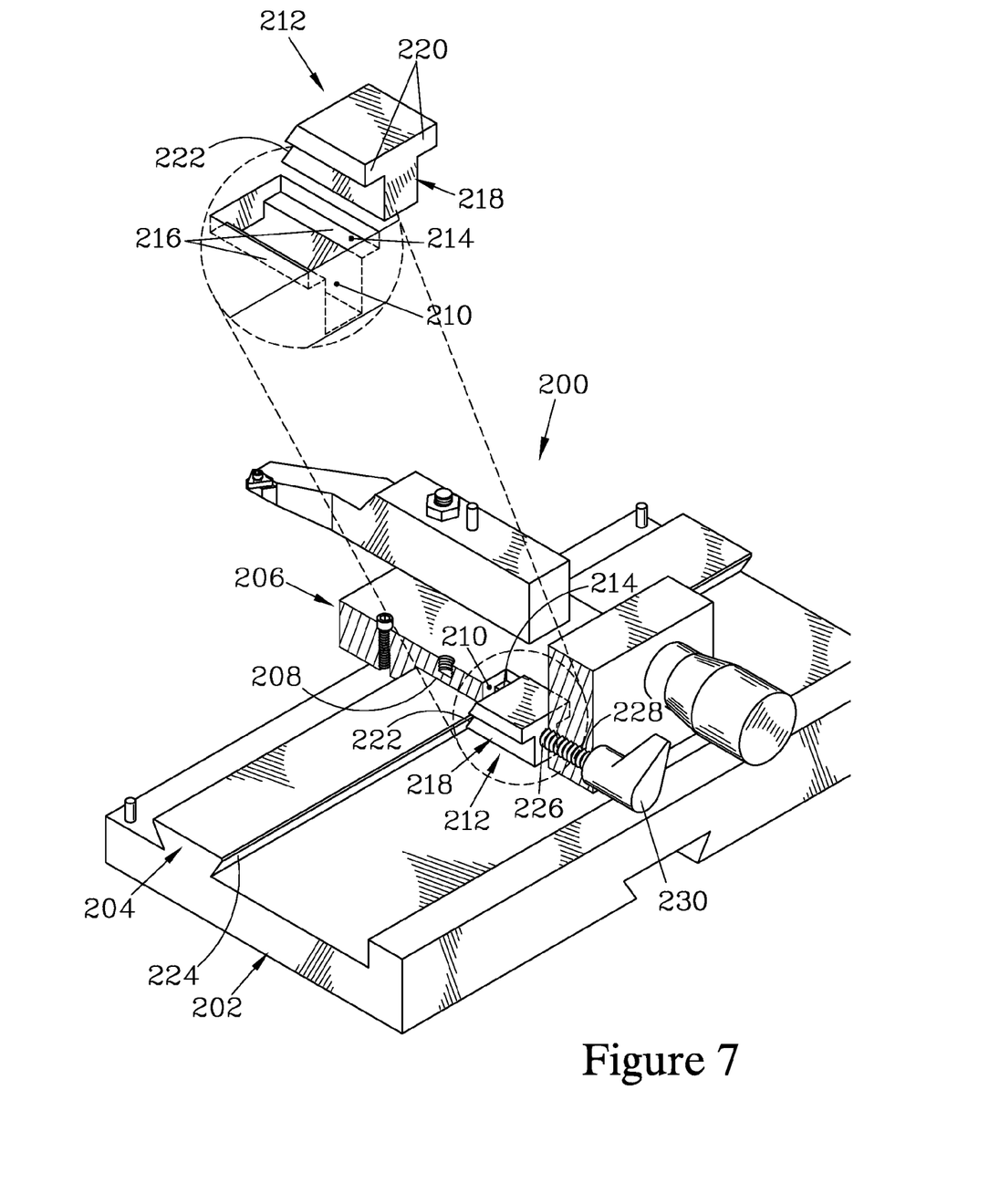

FIG. 7 is an isometric view illustrating another embodiment of the present invention, a cutting head assembly 200. The cutting head assembly 200 again mounts onto a platform 202, the cutting head assembly 200 having a platform key 204, that is affixed to the platform 202, and a plate 206, having a plate keyway 208 that is configured to slidably engage the platform key 204. This embodiment differs in the unified means for locking the platform key 204 with respect to the plate keyway 208 and means for applying a force to generate a compressive load between the plate 206 and the platform 202 when the means for locking is activated.

In this embodiment, the plate 206 again has a cavity 210 that communicates with the plate keyway 208. A locking block 212 is slidably mounted in the cavity 210 so as to translate with respect thereto in a direction normal to the plate keyway 208. The cavity 210 is bounded, in part, by a recessed region 214 of the plate 206, the recessed region 214 forming a pair of ledges 216 that face away from the platform 202. The locking block 212 has a T-shaped cross section, with a block body 218 and a pair of block extensions 220 that are configured to slidably engage the ledges 216. Since the cavity 210 communicates with the plate keyway 208, the locking block 212 can be advanced in the cavity 210 such that the block body 218 can be translated, at least in part, into the plate keyway 208. When the plate 206 is engaged with the platform 202, such advancement causes the block body 218 to forcibly engage the platform key 204.

The block body 218 has a sloped surface 222 configured to mate against a sloped side 224 of the platform key 204 that faces the cavity 210. When the locking block 212 is advanced, the sloped surface 222 forcibly engages the sloped side 224, and tends to slide therealong, forcing the locking block 212 down toward the platform 202. This forcing causes the block extensions 220 to apply a force against the ledges 216 so as to create a compressive load between the plate 206 and the platform 202. Thus, when advanced, the locking block 212 serves as a unified structure that provides both the means for locking the platform key 204 with respect to the plate keyway 208 and the means for applying a force to generate a compressive load between the plate 206 and the platform 202 when the means for locking is activated.

To forcibly advance the locking block 212, a block-activating shaft 226 is provided, which in this embodiment is movably mounted in a block-activating shaft passage 228 in the plate 206. The block-activating shaft passage 228 is configured to direct the block-activating shaft 226 against the locking block 212. Means for advancing the block-activating shaft 226 in the block-activating shaft passage 228 are provided. In this embodiment, the block-activating shaft 226 is threadably engaged with the block-activating shaft passage 228 so as to advance therein when a turn down handle 230 is operated to turn the block-activating shaft 226. When the block-activating shaft 226 is rotated by the operator turning the turn down handle 230, the block-activating shaft 226 advances in the block-activating shaft passage 228 and forces the locking block 212 against the platform key 204.

Figure 8:
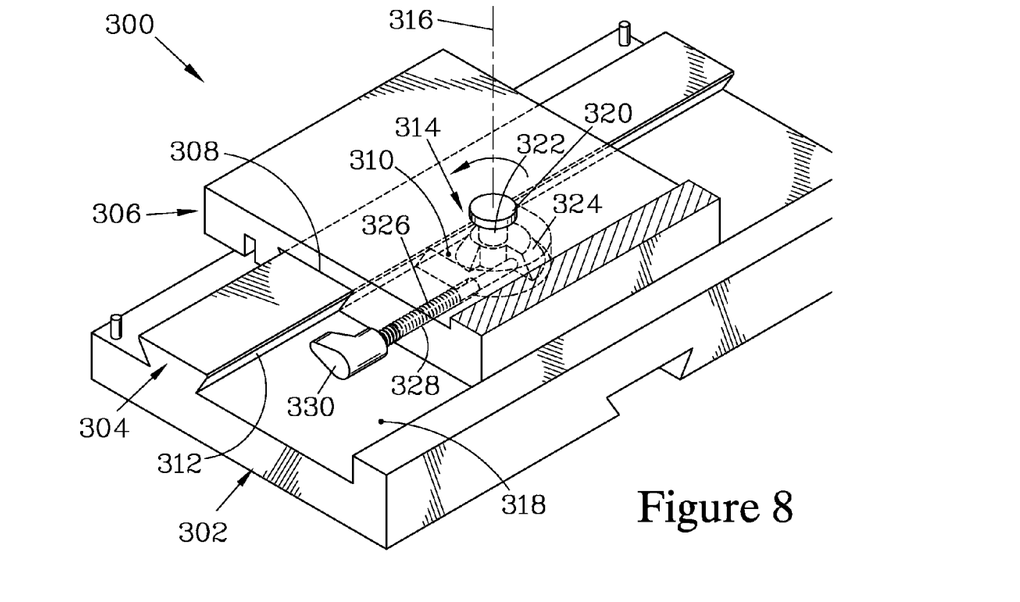
FIG. 8 is an isometric view of an embodiment that employs an eccentric cam that is rotatably mounted to the plate. A cam-activating shaft is threadably mounted in the plate, and in this embodiment, extends parallel to the keyway. The cam-activating shaft, when advanced, engages the cam and causes it to rotate. The cam is configured with a cam surface which varies in distance from the axis of rotation of the cam as a function of angle. Thus, as the cam is rotated, the cam surface moves into engagement with one side of the key. Again, the inclination of the side of the key creates a downward force on the cam, which in turn is transferred to the plate by a cam bearing element on the cam.

FIG. 8 is an isometric view illustrating another embodiment of the present invention, a cutting head assembly 300 which again mounts onto a platform 302. The cutting head assembly 300 has a platform key 304, affixed to the platform 302, and a plate 306, having a plate keyway 308 that slidably engages the platform key 304. This embodiment again differs in the means for locking the platform key 304 with respect to the plate keyway 308 and the means for applying a force to generate a compressive load between the plate 306 and the platform 302 when the means for locking is activated. These means are again provided by a unified structure.

In this embodiment, the plate 306 again has a cavity 310 that communicates with the plate keyway 308, and the platform key 304 has a sloped side 312 facing the cavity 310. An eccentric cam 314 resides in the cavity 310 and is rotatably mounted with respect to the plate 306 so as to rotate about a cam axis 316 that is normal to a platform planar surface 318. The rotatable mounting of the eccentric cam 314 is configured so as to provide a cam bearing element 320 that is configured to forcibly engage a plate bearing surface 322 on the plate 306 when the eccentric cam 314 is advanced downward on the cam axis 316 toward the platform 302. The eccentric cam 314 also has a cam surface 324 that is configured to mate against the sloped side 312 and which varies in distance from the cam axis 316 as a function of angle; thus, the cam surface 324 is brought into extension into the plate keyway 308 as the eccentric cam 314 is rotated about the cam axis 316. Thus, when the eccentric cam 314 is rotated as indicated in FIG. 8, the cam surface 324 is brought into forcible engagement with the sloped side 312, thereby providing means for locking the platform key 304 with respect to the plate keyway 308. The slope of the sloped side 312 and the cam surface 324 acts to cause a downward force on the eccentric cam 314 as the eccentric cam 314 is forcibly rotated. This downward force in turn is transmitted to the plate bearing surface 322 by the cam bearing element 320, thereby providing means for generating a compressive load between the plate 306 and the platform 302 when the means for locking is activated. Thus, the eccentric cam 314 forms a unified structure for providing the means for locking the platform key 304 with respect to the plate keyway 308 and the means for generating a compressive load between the plate 306 and the platform 302.

A cam-activating shaft 326 is provided to forcibly rotate the eccentric cam 314 so as to bring the cam surface 324 into extension into the plate keyway 308. The cam-activating shaft 326 in this embodiment is movably mounted in a cam-activating shaft passage 328 in the plate 306. The cam-activating shaft passage 328 is configured to direct the cam-activating shaft 326 against the eccentric cam 314 such that, when the cam-activating shaft 326 is advance in the cam-activating shaft passage 328, it forces the eccentric cam 314 to rotate so as to bring the cam surface 324 into the plate keyway 308. Means for advancing the cam-activating shaft 326 in the cam-activating shaft passage 328 are provided. In this embodiment, the cam-activating shaft 326 is threadably engaged with the cam-activating shaft passage 328 and has a turn down handle 330 to allow an operator to turn the cam-activating shaft 326 to advance it in the cam-activating shaft passage 328.

Figure 9:
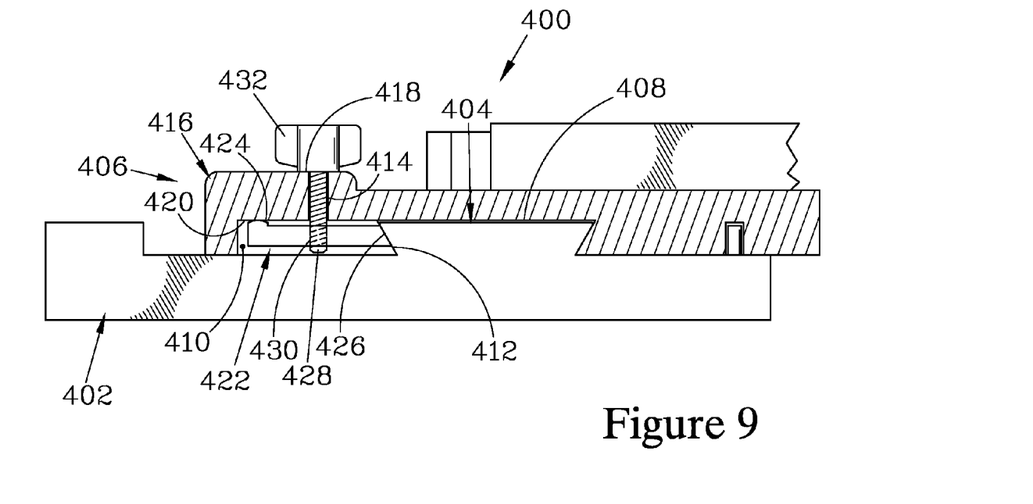
FIG. 9 is a section view that illustrates an embodiment having a jam block which is threadably engaged with an activating screw. In this embodiment, the activating screw is rotatably mounted to the plate. The jam block has a block bearing surface, configured to engage a cavity bearing surface on the plate, and a block locking surface, positioned to engage a sloping surface of the platform key. When the activating screw is rotated to raise the jam block, the jam block forcibly engages the cavity bearing surface and the platform key, which limits its motion; further tightening of the activating screw results in a downward force on the activating screw, and a knob affixed to the activating screw applies a downward force on the plate, forcing it against the platform.

FIG. 9 is an isometric view illustrating another embodiment of the present invention, a cutting head assembly 400 for mounting to a platform 402. The cutting head assembly 400 has a platform key 404 affixed to the platform 402 and a plate 406 having a plate keyway 408 that slidably engages the platform key 404. This embodiment employs means for locking the platform key 404 with respect to the plate keyway 408 and means for applying a force to generate a compressive load between the plate 406 and the platform 402 which are not provided by a unified structure.

Yet again, the plate 406 has a cavity 410 that communicates with the plate keyway 408, and the platform key 404 has a sloped side 412 facing the cavity 410. The plate 406 of this embodiment also has a screw passage 414 extending through a rear portion 416 of the plate 406 so as to terminate at the cavity 410. The screw passage 414 terminates at the other end at a plate bearing surface 418 that faces away from the platform 402 and surrounds the screw passage 414. The cavity 410 is provided with a cavity bearing surface 420 located such that the screw passage 414 is interposed between the cavity bearing surface 420 and the plate keyway 408.

A jam block 422 resides in the cavity 410, and is configured with a block bearing surface 424 located for engaging the cavity bearing surface 420. The jam block 422 is further configured such that, when the jam block 422 is moved toward the screw passage 414, the jam block 422 extends into the plate keyway 408. The jam block 422 has a block locking surface 426 that is brought into engagement with the sloped side 412 of the platform key 404 when the jam block 422 is raised toward the screw passage 414.

An activating screw 428 passes through the screw passage 414 and is threadably engaged with a threaded passage 430 in the jam block 422. The activating screw 428 has a knob 432 that allows an operator to readily turn the activating screw 428. The knob 432 is also configured to forcibly engage the plate bearing surface 418 of the plate 406. When the activating screw 428 is rotated, the threadable engagement with the threaded passage 430 causes the jam block 422 to move either toward or away from the knob 432. When the activating screw 428 is rotated to draw the jam block 422 toward the knob 432, the block bearing surface 424 is brought into forcible engagement with the cavity bearing surface 420, while the block locking surface 426 is brought into forcible engagement with the sloped side 412 of the platform key 404. Since the jam block 422 is constrained in the cavity 410, its forcible engagement with the sloped side 412 provides means for locking the platform key 404 with respect to the plate keyway 408. The engagement of the jam block 422 with the cavity bearing surface 420 and the sloped side 412 also limits upward motion of the jam block 422, so that further tightening of the knob 432 creates a downward force on the knob 432, forcing it against the plate bearing surface 418. This downward force of the knob 432 provides means for applying a force to generate a compressive load between the plate 406 and the platform 402 in response to activation of the locking means.

Figure 10:
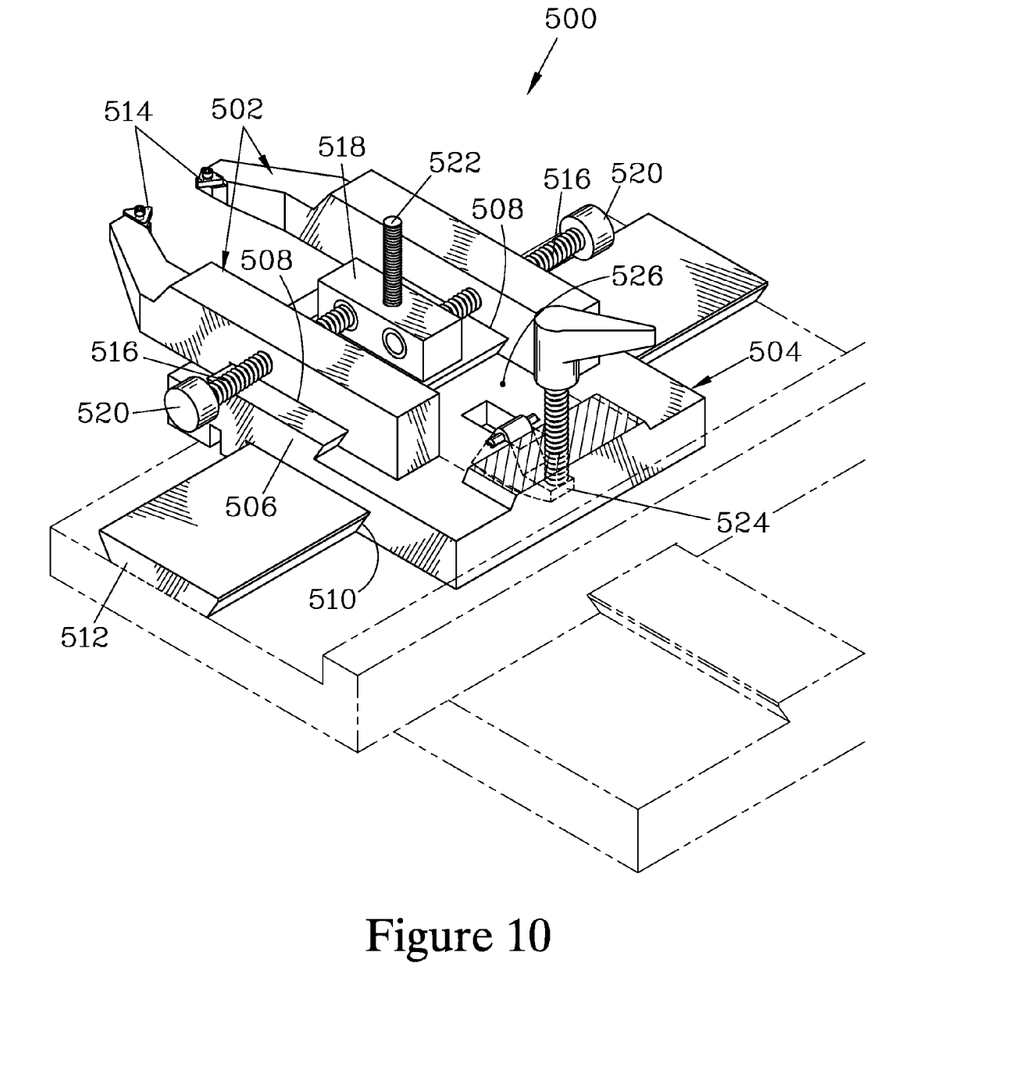
FIG. 10 is an isometric view of an embodiment where the adjustment of the tool bit arms is provided by translating the tool bit arms relative to each other by sliding on a key provided on the plate.

FIG. 10 illustrates a cutting head assembly 500 which forms another embodiment of the present invention. The cutting head assembly 500 employs a different scheme for adjusting the position of a pair of tool bit arms 502 with respect to a plate 504 than is employed in the embodiments discussed earlier. In the cutting head assembly 500, the plate 504 is provided with a plate key 506, and each of the tool bit arms 502 has an arm keyway 508 configured to slidably engage the plate key 506. The plate key 506 is parallel to a plate keyway 510 that in turn slidably engages a platform key 512. As each of the tool bit arms 502 traverses the plate key 506, the separation between a pair of tool bits 514 mounted to the tool bit arms 502 varies.

Means for adjusting the separation between the tool bits 514 are provided by arm adjustment screws 516. Each of the arm adjustment screws 516 threadably engages one of the tool bit arms 502 and rotatably engages a screw block 518 affixed to the plate key 506. As the arm adjustment screw 516 is rotated, the threadable engagement moves the associated tool bit arm 502 along the plate key 506, changing the separation between the tool bits 514. A knob 520 is provided on each of the arm adjustment screws 516 to allow an operator to readily rotate the arm adjustment screw 516.

Once the tool bit arms 502 are adjusted to the desired positions to set the depth of cut of the tool bits 514, they can be locked in position by a locking block (not shown) which is secured to a threaded post 522 in the manner discussed above for the embodiment shown in FIGS. 2 through 6. In this embodiment, the threaded post 522 extends from the screw block 518.

This embodiment employs a cam 524 that functions similarly to the cam 142 shown in FIGS. 3 through 6 and discussed above. The cam 524 is located in a region 526 that is bounded by the projections of the tool bit arms 502 to assure that the clamping forces provided by the cam 524 are substantially centered with respect to the tool bits 514 so as to balance the stabilizing forces experienced by the tool bits 514.

While the novel features of the present invention have been described in terms of particular embodiments and preferred applications, it should be appreciated by one skilled in the art that substitution of materials and modification of details obviously can be made without departing from the spirit of the invention.

What is claimed is:

1. A cutting head assembly for attachment to an on-vehicle brake disk lathe that mounts to a wheel hub of a vehicle on which a brake disk is mounted, the on-vehicle brake disk lathe having a base, a platform and means for moving the platform in a direction normal to the axis of rotation of the brake disk, the cutting head assembly comprising:
a platform key attached to the platform and extending parallel to the disk axis when the brake lathe is mounted and aligned with respect to the brake disk;
a plate having a plate keyway configured to slidably engage said platform key, said plate engaging the platform so as to remain slidably engaged therewith when the cutting head assembly is inverted;
a pair of tool bit arms adjustably mounted with respect to said plate and each serving to support and position a tool bit mounted thereto;
means for adjusting the separation between the tool bits mounted to said tool bit arms;
means for locking said tool bit arms in position with respect to said plate;
a cam for locking said platform key with respect to said plate keyway, said cam residing principally in said plate and being located in a region of said plate bounded by the projection of said tool bit arms onto said plate, said cam also providing
means for applying a force to said region of said plate bounded by the projections of said tool bit arms to generate a compressive load between said plate and the platform responsive to activating said cam.

2. The cutting head assembly of claim 1 wherein said pair of tool bit arms are each pivotally mounted to said plate and positionable such that each of said tool bit arms can be held substantially perpendicular to said plate keyway,
and further wherein said means for adjusting the separation between the tool bits further comprises:
means for individually adjusting the pitch of each of said tool bit arms with respect to said plate keyway.

3. The cutting head assembly of claim 1 wherein said platform key has a key width $W_{PK}$ that increases in a linear manner with height.

4. The cutting head assembly of claim 3 further comprising:
a pair of limit pins extending from a platform upper surface of the platform;
a pin slot in said plate, said pin slot being oriented parallel to said plate keyway and configured to pass over said limit pins; and
a stop element on said plate extending into said pin slot, wherein said limit pins are positioned to bracket said stop element and to engage said stop element to limit translation of said plate so as to maintain said plate keyway engaged with said platform key.

5. The cutting head assembly of
claim 1 wherein said cam is mounted onto a cam shaft and housed in a cavity of said plate, said cavity being configured with a cradle for supporting said cam shaft so as to allow pivoting of said cam and being configured to communicate with said plate keyway so as to allow said cam to be pivoted, at least in part, into said plate keyway; and
the cutting head assembly further comprising:
a cam-activating shaft for contacting said cam;
a cam-activating shaft passage in a rear section of said plate, said cam-activating shaft passage being positioned such that said cam-activating shaft is directed onto said cam in such a manner as to induce pivoting of said cam toward said plate keyway when said cam-activating shaft is advanced; and
means for advancing said cam-activating shaft in said cam-activating shaft passage.

6. The cutting head assembly of claim 1 wherein said cam is an eccentric cam rotatably mounted in said plate so as to rotate about a cam axis that is normal to a platform planar surface that is slidably engaged by said plate, said eccentric cam having a cam surface that varies in distance from said cam axis as a function of angle so as to be brought into extension into said plate keyway as said eccentric cam is rotated, said cam also having a cam bearing element configured to forcibly engage a plate bearing surface on said plate; and
the cutting head assembly further comprising:
a cam-activating shaft for contacting said cam;
a cam-activating shaft passage in said plate, said cam-activating shaft passage being positioned such that said cam-activating shaft is directed onto said cam in such a manner as to induce rotation of said cam to bring said cam surface into extension into said plate keyway when said cam-activating shaft is advanced; and
means for advancing said cam-activating shaft in said cam-activating shaft passage.

7. The cutting head assembly of claim 1 wherein said tool bit arms are each slidably mounted to said plate and are each positioned so as to extend substantially perpendicular to said plate keyway,
and further wherein said means for adjusting the separation between the tool bits further comprises:
means for individually translating each of said tool bit arms along said plate parallel to said plate keyway.

* * * * *